United States Patent [19]

Abe

[11] 4,042,528
[45] Aug. 16, 1977

[54] WATER-SOLUBLE DEFOAMING AGENTS

[75] Inventor: Akira Abe, Annaka, Japan

[73] Assignee: Shin-Etsu Chemical Co., Ltd., Tokyo, Japan

[21] Appl. No.: 561,686

[22] Filed: Mar. 25, 1975

[30] Foreign Application Priority Data

Mar. 29, 1974  Japan .................................. 49-35215

[51] Int. Cl.$^2$ ............................................. B01D 19/04
[52] U.S. Cl. .......................................... 252/358; 8/91; 8/92; 8/93; 252/321; 423/232
[58] Field of Search ................................ 252/358, 321

[56]  References Cited
U.S. PATENT DOCUMENTS

| | | | |
|---|---|---|---|
| 2,753,309 | 7/1956 | Figdor | 252/358 |
| 3,180,836 | 4/1965 | Jursich | 252/321 |
| 3,250,727 | 5/1966 | Noll et al. | 252/358 |
| 3,784,479 | 1/1974 | Keil | 252/358 |
| 3,846,329 | 11/1974 | Householder et al. | 252/358 |

Primary Examiner—Richard D. Lovering
Attorney, Agent, or Firm—Toren, McGeady and Stanger

[57]  ABSTRACT

Defoaming agent comprising 20 to 94% by weight of an organopolysiloxane-polyoxyalkylene copolymer in which the polyoxyalkylene group is bonded to a silicon atom directly through the Si—C linkage, the ratio of the polyoxyalkylene group to the copolymer being in the range of from 0.3 to 0.8 by weight, 5 to 50% by weight of a polyoxyalkyleneglycol derivative, and 1 to 30% by weight of a nonionic surfactant having the polyoxyalkylene structure in its molecule. The defoaming agents have excellent properties of solubility in water, durability of anti-foaming activity and stability to alkalinity. They are useful for reducing the formation of foams particularly in a high-temperature dyeing bath.

11 Claims, No Drawings

WATER-SOLUBLE DEFOAMING AGENTS

FIELD OF THE INVENTION

This invention relates to water-soluble defoaming agents having improved durability of the anti-foaming activity and an excellent stability to alkalinity even at high temperatures.

DESCRIPTION OF THE PRIOR ART

Water-soluble defoaming agents or antifoam agents are known in the prior art for defoaming aqueous dyeing baths at high temperatures, which comprise silicones modified with polyoxyalkyleneglycols, (see U.S. Pat. No. 3,233,986). Those defoaming agents are defective in serveral points. For example, the silicone defoaming agents modified with a large amount of polyoxyalkyleneglycol have higher clouding points and higher solubility in water, but their anti-foaming activities are relatively low. On the contrary, those modified with smaller amounts of polyalkyleneglycol have lower clouding points and superior anti-foaming activity, but their solubility in water is lower and causes the undesired tarring on dyed fabrics when employed in the high-temperature dyeing process, accompanied by difficulty in the rinse after dyeing.

In order to overcome the above problems, several defoaming compositions have been proposed, in which the silicones modified as described above were admixed with finely divided inorganic fillers, such as silica, alumina and titanium dioxide, or with small amounts of dimethylpolysiloxane fluid, as disclosed in, for example, U.S. Pat. Nos. 3,700,400 and 3,746,653. They are free from the above-described defects but disadvantaged by reduced durability of anti-foaming activity.

OBJECTS OF THE INVENTION

Accordingly, it is an object of this invention to provide water-soluble defoaming agents which are free of the various defects existent in the conventional defoaming agents and, on the other hand, are excellent in solubility in water, durability of anti-foaming activity and stability to alkalinity at high temperature. It is another object of the invention to provide defoaming agents useful in particular for reducing the formation of foams in a high-temperature dyeing bath.

SUMMARY OF THE INVENTION

The water-soluble agents of the invention comprise (i) from 20 to 94% by weight of an organopolysiloxane-polyoxyalkylene copolymer represented by the general formula $$G_a R_b^1 SiO_{4-a-b/2} \qquad (I)$$

where G is a polyoxyalkylene groups represented by the general formula -R'-(-OR''-)$_m$A$^1$ where R' is a divalent alkylene group having 1 to 10 carbon atoms, R'' is a divalent alkylene group having 2 to 10 carbon atoms, A$^1$ is a hydroxy group or a monovalent organic group, and $m$ is a positive number; R$^1$ is a substituted or unsubstituted monovalent hydrocarbon group, and $a$ and $b$ each are positive numbers with the proviso that $(a+b)$ = 1.9 to 2.1, the ratio of the polyoxyalkylene groups denoted by G to the organopolysiloxane-polyoxyalkylene copolymer being in the range of from 0.3 to 0.8 by weight, (ii) from 5 to 50% by weight of a polyoxyalkyleneglycol derivative represented by the general formula $$R^3-(-OR^2-)_n A^2 \qquad (II)$$

where R$^2$ is a divalent alkylene group having 2 to 10 carbon atoms, R$^3$ is a saturated or unsaturated monovalent hydrocarbon group having 2 to 20 carbon atoms, A$^2$ is a hydroxy group or a monovalent organic group, and $n$ is a positive number, and (iii) from 1 to 30% by weight of a nonionic surface active agent having the polyoxyalkylene structure in its molecule.

DETAILED DESCRIPTION OF THE INVENTION

The present invention is based on the discovery that the defoaming agents comprising the organopolysiloxanepolyoxyalkylene copolymer, the polyoxyalkyleneglycol derivative and the nonionic surface active agent having the polyoxyalkylene structure in its molecule have a very high solubility in water, stability to alkalinity at higher temperatures and durability of the antifoam activity and that they bring about no troublesome tarring to dyed fabrics.

The organopolysiloxane-polyoxyalkylene copolymer as component (i) is represented by the above-mentioned general formula (I) where the polyoxyalkylene group expressed by G is made bonded to a silicon atom directly through the Si—C linkage. This is because that any organopolysiloxane-polyoxyalkylene copolymers in which the polyoxyalkylene group is bonded to a silicon atom through the Si—O—C linkage tends to become hydrolyzed in an aqueous medium especially when the medium is alkaline, thus leading to a poorer durability of anti-foam activity.

The organopolysiloxane-polyoxyalkylene copolymer is composed of from 20 to 70%, preferably from 30 to 50%, by weight of the organopolysiloxane residue and from 80 to 30%, preferably from 70 to 50%, by weight of the polyoxyalkylene groups. When the organopolysiloxane residue is less than 20% by weight, the water-solubility of the resulting defoaming agent will become greater, while the durability of anti-foam activity will become poorer. On the other hand, when it is more than 70% by weight, the water-solubility of the defoaming agent will become lower.

In the general formula (I) above, G is a polyoxyalkylene group represented by the general formula -R'-(-OR''-)$_m$A$^1$, wherein R' is a divalent hydrocarbon group having 1 to 10 carbon atoms, such as methylene, ethylene, propylene and butylene groups, R'' is an alkylene group having 2 to 10 carbon atoms, such as ethylene, propylene and butylene groups, A$^1$ is a hydroxy group or a monovalent organic group, such as monovalent hydrocarbon groups, exemplified by methyl, ethyl and propyl groups, alkoxy groups exemplified by methoxy, ethoxy, propoxy, butoxy and stearyloxy groups, acyl groups exemplified by acetyl, propionyl and butylyl groups, acyloxy groups exemplified by acetoxy, propionyloxy and butylyloxy groups and isocyanate group (—NCO), and $m$ is a positive number, preferably from 5 to 50. R$^1$ in the general formula (I) is selected from substituted or unsubstituted monovalent hydrocarbon groups having 1 to 3 carbon atoms, such as methyl, ethyl, propyl, vinyl and allyl groups and halogen-substituted derivatives thereof, substantially all of the groups represented by R' being preferably methyl groups, and $a$ and $b$ each are positive numbers with the proviso that $(a + b) = 1.9$ to $2.1$. It is necessary that the ratio of the polyoxyalkylene groups denoted by R to its copolymer with organopolysiloxane according to the above-mentioned formula (I) is in the range of from 0.3 to 0.8 by weight, preferably from 0.5 to 0.7 by weight.

The examples of the organopolysiloxanepolyoxyalkylene copolymers suitable as component (i) include the following.

(a)
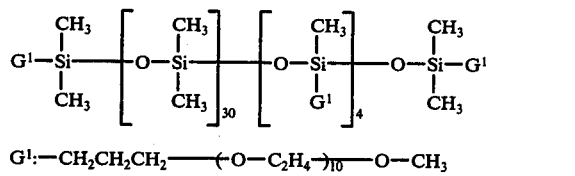

(b)
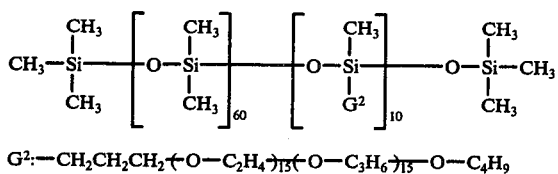

(c)
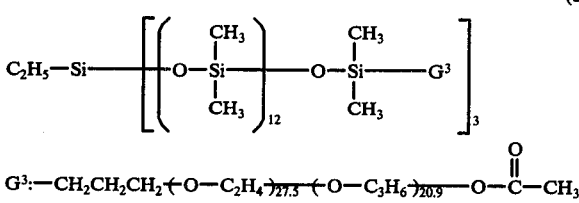

(d)
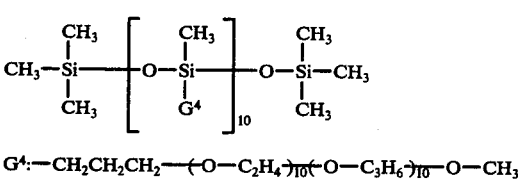

(e)
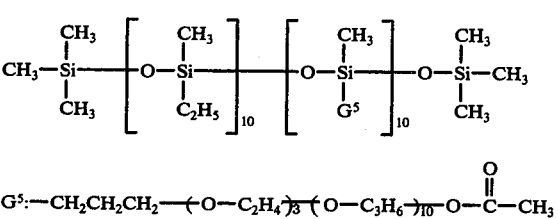

The polyoxyalkyleneglycol derivative as component (ii) is represented by the general formula (II) above where $R^3$ is a saturated or unsaturated hydrocarbon group having 2 to 20, or preferably 3 to 8, carbon atoms in a molecule, such as ethyl, propyl, butyl, octyl, vinyl and allyl groups, and $R^2$, $A^2$ and $n$ are the same as the above-defined $R''$, $A^1$ and $m$, respectively. It is preferred that the polyoxyalkyleneglycol derivative as component (ii) has a molecular weight in the range of from 500 to 3,000, because the polyoxyalkyleneglycol derivatives of a molecular weight smaller than 500 cannot give sufficient durability of anti-foam activity to the resulting defoaming agents, while those of a greater molecular weight than 3,000 make the defoaming agents difficult to disperse in an aqueous solution, resulting in the occurrence of the undesired tarring on dyed fabrics.

More than 2 kinds of alkylene groups can be contained in a molecule of the polyoxyalkyleneglycol derivative.

The polyoxyalkyleneglycol derivatives as component (ii) are exemplified by the following.

a. $C_3H_7$—$(O$—$C_2H_4)_{10}O$—$CH_3$.

b. 
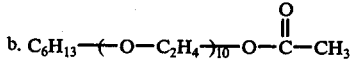

c. 

d. 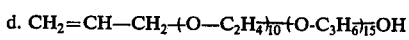

e. 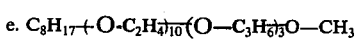

f. 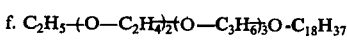

The nonionic surface active agent as component (iii) according to the present invention is added for purposes of enhancing the solubility of the defoaming agent in water without affecting anti-foam activity. It necessarily has the polyoxyalkylene structure in its molecule, with the oxyalkylene units of at least 7 in number, or preferably ranging from 8 to 20 per molecule. Smaller numbers of the oxyalkylene units than 7 renders the surface active agent oleophilic and difficulty dispersible in aqueous solutions, while too large numbers of the oxyalkylene units work to make the surface active agent become solid, exhibiting an adverse effect to promote foaming. The nonionic surface active agents containing oxyalkylene units in their molecule suitable for the purpose are exemplified by polyoxyethylene sorbitan fatty acid esters, polyoxyethylene sorbitol fatty acid esters, polyoxyethylene fatty acid esters, polyoxyethylene aryl ethers, polyoxyethylene alkaryl ethers, castor oil modified with polyoxyethylenes, and polyoxyethylene-polyoxypropylene ethers with higher alcohols.

The water-soluble defoaming agent of the present invention is prepared by mixing components (i) to (iii) by a mixing machine of any type. The mixing ratio of the individual components is such that the amounts of components (i), (ii) and (iii) are from 20 to 94% by weight, from 5 to 50%, or preferably from 10 to 30% by weight, and from 1 to 30% by weight, respectively. A smaller amount of components (i) than 20% by weight results in poorer durability of anti-defoaming activity, while a larger amount than 94% by weight results in poorer dispersibility in aqueous solutions.

When the defoaming agent contains a larger amount of component (ii) than 50% by weight, it is required to use it in larger amounts especially in the earlier stage of a dyeing process, while any defoaming agent containing a smaller amount of component (ii) than 5% by weight is inferior in the durability of anti-foaming activity. A larger amount of component (iii) than 30% by weight brings about economical disadvantages, while a smaller amount of component (iii) cannot give sufficient improvement in anti-foaming activity as well as in water-solubility.

The defoaming agents of the present invention are particularly suitable for high-temperature dyeing by the jet-drying process or tease-dyeing process of polyester or other fibers. The defoaming agents of the present invention have a higher dispersibility in water than the conventional defoaming agents of the organopolysiloxane-polyoxyalkylene copolymer type and are free from the trouble of tarring. Therefore, the troublesome procedure of cleaning the yarns or cloths to remove any oil spots from their surface by washing with an organic solvent can be dispensed with. The rinse with water of the dyed fabrics is very easy because of the high solubility of the defoaming agent in water. Very great economical advantages of the defoaming agents according to the invention are attributable to their high antifoam activity and the reduction of their use to only about one-third to about one-fourth quantitywise compared to the case of the conventional defoaming agents. Usually, 10 to 500 p.p.m. of the defoaming agent of the invention is sufficient for a dyeing bath depending on the nature of the bath.

The defoaming agents of the invention are also useful in various fields of chemical technologies other than in the dyeing of fabrics. Exemplary are the process of carbon dioxide absorption by alkaline aqueous solution from cracking gases in the petroleum industry, addition to latex or emulsion coatings, and defoaming in the removal process of unreacted monomer during emulsion polymerization.

In the following examples and controls, parts are all parts by weight and the symbol Me denotes a methyl group.

The dyeing procedures referred to in the examples are as follows.

DYEING PROCEDURE I

Into a glass autoclave equipped with a stirrer were charged 2 g of Palanil Red 3BF (a product of dye by BASF Co.), 0.5 g of Dislol SH (product by Japan Emulsifier Co.), 3 ml of Squoarol 900 (product by Kao Soap Co.), variable amounts of the defoaming agent of the present invention and 1 liter of water together with a cloth of polyester taffeta of the size 10 cm by 10 cm and the temperature was raised gradually up to 108° C in one hour. The temperature was kept at 108° C for 1 hour with the stirrer operated with the velocity of 80 r.p.m. to have the cloth dyed.

Recorded data for foaming is the time to the beginning of foaming from the moment when the temperature of the dyeing bath reached 108° C. Tarring was examined visually for the dyed cloths after 10 minutes of rinse with water and drying.

DYEING PROCEDURE II

Into a glass autoclave equipped with a stirrer were charged 2 g of Mitsui Miketon Poly Red (a product of dye by Mitsui-Toatsu Chemical Co.), 3 g of Dislol SH, variable amounts of the defoaming agent of the present invention and 1 liter of water together with a 10 cm by 10 cm cloth of mixed spun polyester-rayon (6:4) and the temperature was raised gradually up to 130° C in 1 hour. The temperature was kept there for 2 hours with the stirrer operated with a velocity of 80 r.p.m. to have the cloth dyed. The height of foams above the liquid surface was recorded at intervals of 30 minutes.

EXAMPLE 1

A mixture of 50 parts of an organopolysiloxane-polyoxyalkylene copolymer expressed by the formula

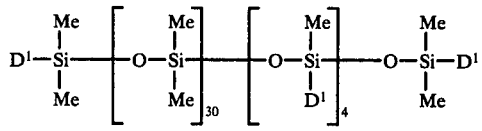

where $D^1$ is a polyoxyalkylene group expressed by the formula $-CH_2CH_2CH_2+O-C_2H_4\overline{)_{10}}-O-Me$, 30 parts of a polyoxyalkyleneglycol derivative expressed by the formula $$C_8H_{17}+O-C_2H_4\overline{)_{10}}+O-C_3H_6\overline{)_3}-O-Me$$

and 20 parts of polyethylenesorbitan monolaurate having 10 oxyethylene units was blended homogeneously by a stirrer, to give a water-soluble defoaming agent.

A defoaming test (Experiment 1) was carried out in accordance with the dyeing procedure I above by use of 0.04 g of the defoaming agent obtained above. The data for the foaming and tarring are shown in Table I.

A control test (Experiment 2) was carried out is similar manners, with 0.04 g of the same organopolysiloxane-polyoxyalkylene copolymer as employed above but without the polyoxyalkyleneglycol derivative and polyethylenesorbitan monolaurate. The results are shown in the same table.

TABLE I

|  | Present invention | Control |
| --- | --- | --- |
| Experiment No. | 1 | 2 |
| Time to foaming, minutes | 53 | 20 |
| Tarring | None | A little |

EXAMPLE 2

A mixture of 60 parts of an organopolysiloxane-polyoxyalkylene copolymer expressed by the formula

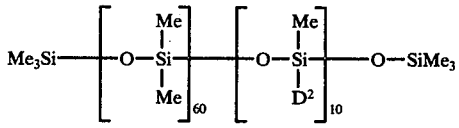

where $D^2$ is a polyoxyalkylene group expressed by the formula $-CH_2CH_2CH_2+O-C_2H_4\overline{)_{15}}+O-C_3H_6\overline{)_{15}}-O-C_4H_9$, 30 parts of a polyoxyalkyleneglycol derivative expressed by the formula $CH_2=CH-CH_2+O-C_2H_4\overline{)_{10}}+O-C_3H_6\overline{)_{15}}-OH$ and 10 parts of a nonionic surface active agent expressed by the formula

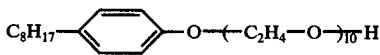

was blended, to give a water-soluble defoaming agent.

Varied amounts of the defoaming agent obtained above were employed in the defoaming tests (Experiments 3 to 5) by the dyeing procedure I, giving the results of foaming and tarring as shown in Table II below.

Control tests (Experiments 6 to 8) were carried out in similar manners with varied amounts as specified in the table of the organopolysiloxane-polyoxyalkylene copolymer but without the polyoxyalkyleneglycol derivative and the nonionic surface agent. The results are also shown in Table II.

Table II

| | Present invention | | | Control | | |
|---|---|---|---|---|---|---|
| Experiment No. | 3 | 4 | 5 | 6 | 7 | 8 |
| Amount of defoaming agent employed, g | 0.1 | 0.2 | 0.4 | 0.1 | 0.2 | 0.4 |
| Time to foaming, minutes | 10 | 33 | 60 | 0 | 5 | 15 |
| Tarring | None | None | None | A little | Much | Much |

EXAMPLE 3

A mixture of 80 parts of an organopolysiloxane-polyoxyalkylene copolymer expressed by the formula

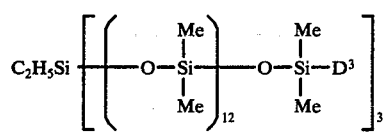

where $D^3$ is a polyoxyalkylene group expressed by the formula

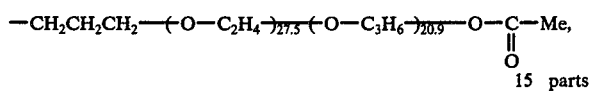

15 parts
of a polyoxyalkyleneglycol derivative expressed by the formula

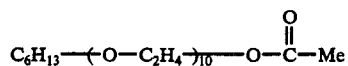

and 5 parts of castor oil modified with 10 oxyethylene units per molecule was blended homogeneously by a mixer, to give a water-soluble defoaming agent.

A test (Experiment 9) was carried out in accordance with the dyeing procedure II with 0.4 g of the defoaming agent obtained above to have the height of the foams above the liquid surface recorded as shown in Table 3 below.

Three control tests were undertaken in a similar manner with the defoaming agent of the invention in Experiment 9 replaced by 0.4 g of the organopolysiloxane-polyoxyalkylene copolymer (Experiment 10), by 0.4 g of the polyoxyalkyleneglycol derivative (Experiment 11) or by 0.4 g of the castor oil modified with polyoxyethylene employed in Experiment 9 (Experiment 12). The height of the foams formed above the liquid surface in each experiment is shown in the same table.

Table III

| | Present invention | | Control | |
|---|---|---|---|---|
| Experiment No. | 9 | 10 | 11 | 12 |
| After 30 min. of dyeing | 0 | 0 | 15 | 5 |
| After 1 hour of dyeing | 0 | 2 | 25 | 15 |
| After 1.5 hour of dyeing | 0 | 4 | >28 | 25 |
| After 2 hours of dyeing | 2 | 15 | >28 | >28 |

EXAMPLE 4

The defoaming agent of Example 1 was added in an amount of 10 or 50 p.p.m. by weight to the 30% aqueous solution of potassium carbonate circulating between an absorption tower operated at 60° C under 20 kg/cm² pressure and a desorption tower operated at 100° C under −0.5 kg/cm² pressure in a process for $CO_2$ removal from the cracking gas in petroleum refinery in order to facilitate the gas-liquid separation and to reduce the pressure drop within the desorption tower by suppressing the foam formation in the potassium carbonate solution. As a measure of the defoaming effect, the time from the beginning of the operation to the moment at which the pressure drop in the running desorption tower reached 100 mmHg was recorded. The results are shown in Table IV to follow.

Control tests were undertaken with the same amounts as above of two defoaming compositions, A and B. Composition A was prepared by blending 95 parts of the organopolysiloxane-polyoxyalkylene copolymer of Example 1 and 5 parts of a finely divided silica filler (Aerosil 200, product of DEGUSSA Co.). Composition B was prepared by blending 80 parts of the same organopolysiloxane-polyoxyalkylene copolymer, 10 parts of dimethylpolysiloxane fluid having a viscosity of 100 cS at 25° C, 5 parts of a 75% by weight solution of an organopolysiloxane resin composed of 28.6 mole % of $(CH_3)_3SiO_{0.5}$ and 72.4 mole % of $SiO_2$ in toluene and 5 parts of the same silicon filler as above. The results are also shown in Table IV.

Table IV

| | Present Invention | Control | |
|---|---|---|---|
| | | A | B |
| Amount of the defoaming agent, added: | | | |
| 10 p.p.m. | 5 hrs. | 0 hr. | 1 hr. |
| 50 p.p.m. | 24 hrs. | 3 hrs. | 5 hrs. |

What is claimed is:

1. A water-soluble defoaming agent for use in high temperature dyeing operations consisting essentially of
   i. from 20 to 94% by weight of an organopolysiloxane-polyoxyalkylene copolymer represented by the general formula $G_a R_b^1 SiO_{4-a-b/2}$
   where G is a polyoxyalkylene group represented by the general formula $-R'+OR''\!\!\:_m\!A_1$ where R' is a divalent alkylene group having 1 to 10 carbon atoms, R'' is a divalent alkylene group having 2 to 10 carbon atoms, $A^1$ is a hydroxy group or a monovalent organic group selected from the class consisting of monovalent hydrocarbon groups, alkoxy groups, acyl groups, acyloxy groups and isocyanate groups, and m is a positive number; $R^1$ is a substituted or unsubstituted monovalent hydrocarbon group having 1 to 3 carbon atoms and halogen-substituted derivatives thereof, and a and b each are positive numbers with the proviso that $(a+b) = 1.9$ to $2.1$, the ratio of said polyoxyalkylene groups denoted by G to said organopolysiloxane-polyoxyalkylene copolymer being in the range of from 0.3 to 0.8 by weight,
   ii. from 5 to 50% by weight of a polyoxyalkyleneglycol derivative represented by the general formula

where $R^2$ is a divalent alkylene group having 2 to 10 carbon atoms, $R^3$ is a saturated or unsaturated monovalent hydrocarbon group having 2 to 20 carbon atoms, $A^2$ is a hydroxy group or a monovalent organic group selected from the class consisting of monovalent hydrocarbon groups, alkoxy groups, acyl groups, acyloxy groups, and isocyanate groups, and $n$ is a positive number, and iii. from 1 to 30% by weight of a nonionic surface active agent having the polyoxyalkylene structure in its molecule and selected from the group consisting of polyoxyethylene sorbitan fatty acid esters, polyoxyethylene sorbitol fatty acid esters, polyoxyethylene fatty acid esters, polyoxyethylene aryl ethers, polyoxyethylene alkaryl ethers, castor oil modified with polyoxyethylenes, and polyoxyethylene-polyoxypropylene ethers with higher alcohols.

2. The water-soluble defoaming agent as claimed in claim 1 wherein the ratio of said polyoxyalkylene groups denoted by G to said organopolysiloxane-polyoxyalkylene copolymer is in the range of from 0.5 to 0.7 by weight.

3. The water-soluble defoaming agent as claimed in claim 1 wherein the value of $m$ is from 5 to 50.

4. The water-soluble defoaming gent as claimed in claimed 1 wherein said polyoxyalkyleneglycol derivative as component (ii) has a molecular weight in the range of from 500 to 3,000.

5. The water-soluble defoaming agent as claimed in claim 1 wherein said nonionic surface active agent as component (iii) contains at least 7 oxyalkylene units per molecule.

6. The water-soluble defoaming agent as claimed in claim 1 wherein said organopolysiloxane-polyoxyalkylene copolymer as component (i) has the formula:

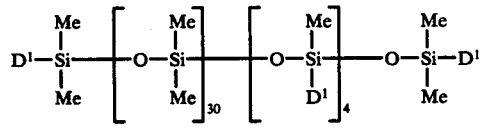

where $D^1$ is a polyoxyalkylene group expressed by the formula $-CH_2CH_2CH_2-(O-C_2H_4)_{10}-O-Me$.

7. The water-soluble defoaming agent as claimed in claim 1 wherein said organopolysiloxane-polyoxyalkylene copolymer as component (i) has the formula:

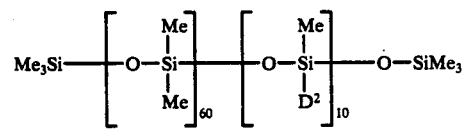

where $D^2$ is a polyoxyalkylene group expressed by the formula $-CH_2CH_2CH_2(O-C_2H_4)_{15}(O-C_3H_6-O-C_4H_9$.

8. The water-soluble defoaming agent as claimed in claim 1 wherein said organopolysiloxane-polyoxyalkylene copolymer as component (i) has the formula:

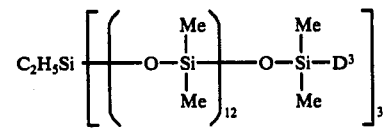

where $D^3$ is a polyoxyalkylene group expressed by the formula

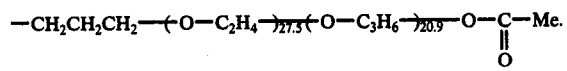

9. The water-soluble defoaming agent as claimed in claim 1 wherein said organopolysiloxane-polyoxyalkylene copolymer as component (i) has the formula:

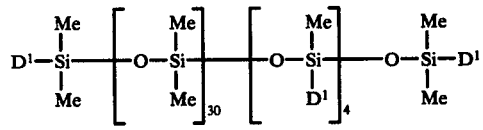

where $D^1$ is a polyoxyalkylene group expressed by the formula $-CH_2CH_2CH_2-(O-C_2H_4)_{10}$ O-Me, component (ii) is a polyoxyalkyleneglycol derivative expressed by the formula

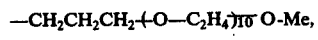

and component (iii) is polyethylenesorbitan monolaurate having 10 oxyethylene units.

10. The water-soluble defoaming agent as claimed in claim 1 wherein said organopolysiloxane-polyoxyalkylene copolymer as component (i) has the formula:

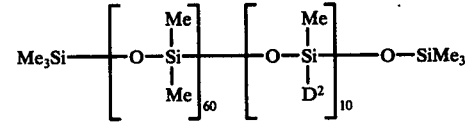

where $D^2$ is a polyoxyalkylene group expressed by the formula

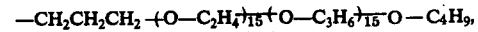

component (ii) is a polyoxyalkyleneglycol derivative expressed by the formula

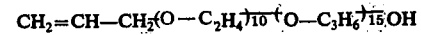

and component (iii) is a nonionic surface active agent expressed by the formula

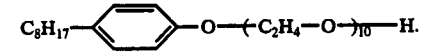

11. The water-soluble defoaming agent as claimed in claim 1 wherein said organopolysiloxane-polyoxyalkylene copolymer as component (i) has the formula:

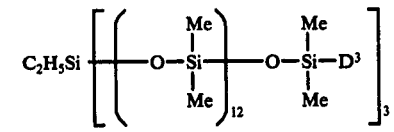

where $D^3$ is a polyoxyalkylene group expressed by the formula component (ii) is a polyoxyalkyleneglycol derivative expressed by the formula
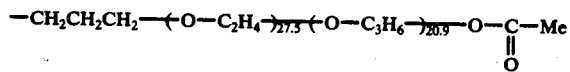
and component (iii) is castor oil modified with 10 oxyethylene units per molecule.
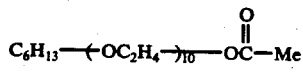
* * * * *